No. 866,579.

PATENTED SEPT. 17, 1907.

L. BURRELL.
MILKING MACHINE.
APPLICATION FILED FEB. 7, 1907.

2 SHEETS—SHEET 1.

Witnesses:
E. A. Volk.
A. G. Dimond.

Inventor.
Loomis Burrell
By
Wilhelm, Parker & Hard
Attorneys.

No. 866,579. PATENTED SEPT. 17, 1907.
L. BURRELL.
MILKING MACHINE.
APPLICATION FILED FEB. 7, 1907.

2 SHEETS—SHEET 2.

Witnesses:
E. A. Volk.
A. G. Dimond.

Inventor
Loomis Burrell
By
Wilhelm, Parker & Hart
Attorneys.

UNITED STATES PATENT OFFICE.

LOOMIS BURRELL, OF LITTLE FALLS, NEW YORK, ASSIGNOR TO D. H. BURRELL & COMPANY, OF LITTLE FALLS, NEW YORK.

MILKING-MACHINE.

No. 866,579.    Specification of Letters Patent.    Patented Sept. 17, 1907.

Application filed February 7, 1907. Serial No. 356,136.

*To all whom it may concern:*

Be it known that I, LOOMIS BURRELL, a citizen of the United States, residing at Little Falls, in the county of Herkimer and State of New York, have invented a new and useful Improvement in Milking-Machines, of which the following is a specification.

This invention relates to that class of milking machines in which suction is applied to the teat cups intermittently by means of a pulsating mechanism. Such pulsators are usually portable and comprise a pulsator piston or valve which alternately applies the suction to the teat cups and disconnects the suction therefrom and a small valve for reversing the movement of the pulsator valve or piston. This reversing valve is usually actuated automatically from the pulsator valve or piston by means of intervening mechanism.

The object of this invention is to actuate the reversing valve and through it the pulsator by a portable motor, preferably a spring-actuated motor or clockwork, so that the movement of this motor will cause a corresponding movement of the pulsator with which it is connected, the motor being portable with the pulsator and permitting the latter to be placed near the cow which is being milked, each motor operating independently of any other motors which may be used at the same time for actuating other pulsators in the same stable.

Figure 1:
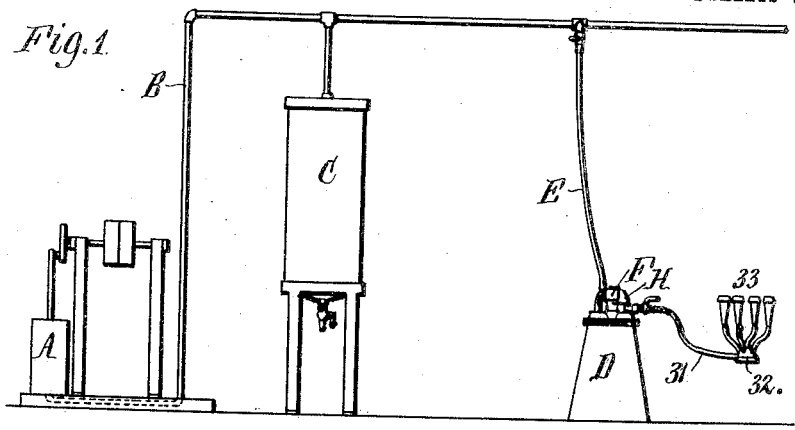
Figure 2:
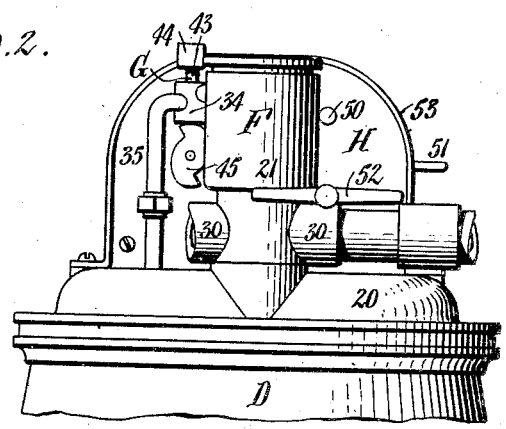
Figure 3:
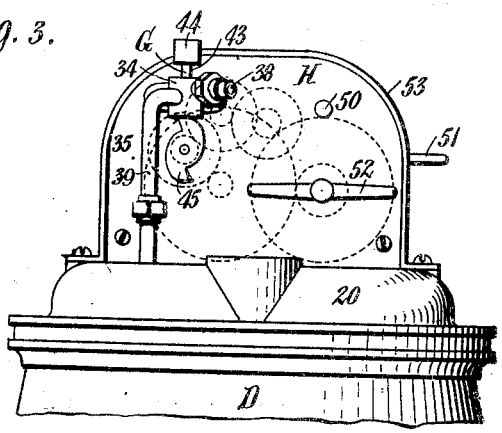
Figure 4:
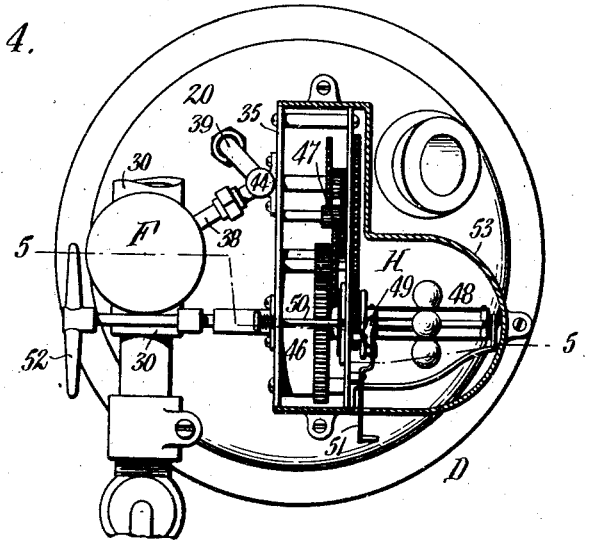
Figure 5:
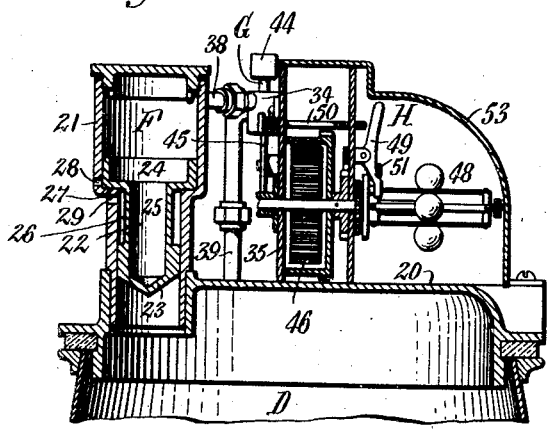
Figures 6, 7:
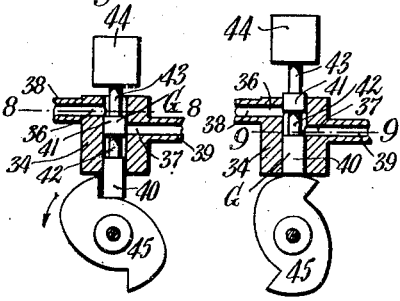
Figure 8:
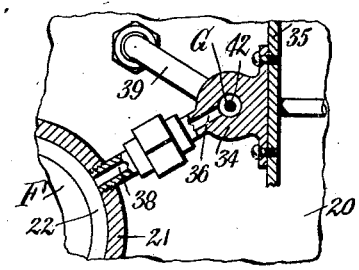
Figure 9:
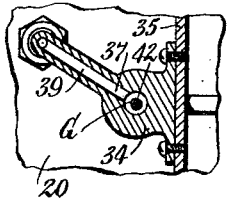

In the accompanying drawings: Figure 1 is an elevation of a milking machine embodying this invention. Fig. 2 is a front elevation of the upper portion of the milk vessel and the pulsator and motor thereon. Fig. 3 is a similar view with the pulsator removed. Fig. 4 is a top plan view of one of the milk vessels and the pulsator and motor thereon, the motor casing being shown in section. Fig. 5 is a sectional elevation in line 5—5, Fig. 4. Fig. 6 is a sectional elevation of the reversing valve, on an enlarged scale, viewed from the rear. Fig. 7 is a similar view showing the reversing valve in a different position. Figs. 8 and 9 are horizontal sections in lines 8—8 and 9—9, Fig. 6, respectively.

Like letters and numerals of reference refer to like parts in the several figures.

A represents the suction pump, B the main suction pipe extending from the same through the stable, C the equalizing tank connected with the suction pipe, D one of the portable milk vessels connected with the main suction pipe by a branch pipe E, F the pulsator mounted on the milk vessel, and G the reversing valve. All of these parts may be of any suitable or well known construction.

H represents a spring-actuated or clockwork motor which is also mounted upon the milk vessel and connected with the reversing valve so as to actuate the latter.

The specific construction of the pulsator and reversing valve shown may be varied in many ways, that shown in the drawings being intended to illustrate a construction which is suitable for the purpose. This construction is as follows: 20 represents the top or cover of the portabile milk vessel and 21 the upright pulsator casing mounted thereon and extending with its open lower end into the vessel. 22 represents the reciprocating pulsator valve or piston arranged in this casing and comprising a lower portion 23 working in the lower portion of the casing, an upper portion 24 which is larger in diameter than the lower portion and works in the correspondingly large upper portion of the casing, and a reduced connecting portion 25 which is surrounded by a cavity 26. 27 represents the horizontal shoulder of the casing formed at the junction of the upper larger portion with the lower smaller portion thereof, and 28, 29 represent the air inlets formed in the casing, one above the other below this shoulder. 30 represents the nipples for the milk pipes arranged on the casing between the shoulder thereof and the top of the milk vessel. 31 represents one of the milk pipes, 32 one of the connectors or couplings, and 33 a set of teat cups.

The reversing valve G is shown as a vertically movable piston valve having its casing 34 secured to the front side of the frame 35 of the motor H. The casing 34 of the reversing valve is provided with an upper port 36 and a lower port 37. The upper port 36 is connected by a pipe 38 with the upper portion of the pulsator casing 21, and the lower port 37 is connected by a pipe 39 with a port in the cover 20 of the milk vessel. The reversing valve comprises a lower portion 40, an upper portion 41, both fitting the bore of the casing 34, and a reduced connecting portion 42. A stem 43 extends upwardly from the valve and carries a weight 44 for pressing the valve downwardly. The valve rests with its lower portion upon a rotary cam 45 which is actuated by the motor and with which the valve is held in contact by the weight 44 or other suitable means. Each arm of the cam has a curved face and an abrupt back and alternately raises the valve and allows the valve to drop. In the elevated position of the valve, shown in Fig. 7, the two ports 36, 37 of the valve casing are in communication through the cavity between the portions 40 and 41 of the valve. In this position of the valve the suction maintained in the milk vessel is applied through the pipes 38 and 39 to the upper portion of the pulsator casing and the large end of the pulsator piston 24 is thereby moved upwardly. In the lower position of the reversing valve, shown in Fig. 6, the upper portion 41 of the valve separates the ports 36, 37 and places the upper port 36 through the upper portion of the bore of the valve casing in communication with the atmosphere, so that the suction is disconnected from the upper portion of the pulsator casing and the external air is admitted to the same. As the pulsator piston 22 is exposed at its lower end to the suction in the milk vessel the piston now moves downwardly: In this manner the reversal of the valve causes the reversal of the movement of the pulsator piston. Instead of actuating the pulsator piston by the suction, as described, it may be actuated by any other suitable or well known pneumatic means.

The motor which actuates the cam 45 by which the reversing valve is actuated may be of any suitable construction. The motor which is shown in the drawings is a spring-actuated motor of well known construction and comprises a spring drum 46, a train of gear wheels 47 connecting the same with the cam 45, a centrifugal governor 48, a lever 49 and screw 50 for regulating the speed, and a lever 51 for stopping the motor at will. The motor is wound by a key 52 applied to the arbor of the spring drum in the usual way, and is preferably so constructed that when wound it will actuate the reversing valve for about thirty minutes, which is more than long enough for one milking. By regulating the speed of the motor the frequency of the pulsations can be regulated, the frequency being preferably from fifty to sixty per minute. The motor is preferably protected by a casing 53 of any suitable construction.

I claim as my invention:

1. In a milking machine, the combination of teat cups, a portable pulsating mechanism which produces pulsations in the teat cups, and an independent portable motor which actuates said pulsating mechanism, substantially as set forth.

2. In a milking machine, the combination of teat cups, a suction apparatus, a portable pulsating mechanism which applies the suction intermittently to the teat cups, and an independent portable motor which actuates said pulsating mechanism, substantially as set forth.

3. In a milking machine, the combination of teat cups, a portable pulsating mechanism which produces pulsations in the teat cups, and a portable spring motor which actuates said pulsating mechanism, substantially as set forth.

4. In a milking machine, the combination of teat cups, a suction apparatus, a portable pulsator which applies the suction intermittently to the teat cups, a reversing valve for the pulsator, and an independent portable motor which actuates the reversing valve, substantially as set forth.

5. In a milking machine, the combination of teat cups, a suction apparatus, a portable pulsator which applies the suction intermittently to the teat cups, a reversing valve for the pulsator, and a portable spring motor which actuates the reversing valve, substantially as set forth.

6. In a milking machine, the combination of teat cups, a suction apparatus, a portable pulsator which applies the suction intermittently to the teat cups and is actuated by the suction, a reversing valve for the pulsator, and an independent portable motor which actuates the reversing valve, substantially as set forth.

7. In a milking machine, the combination of teat cups, a suction apparatus, a portable pulsator which applies the suction intermittently to the teat cups and is actuated by pneumatic means, a reversing valve for the pulsator, and a portable spring motor which actuates the reversing valve, substantially as set forth.

8. In a milking machine, the combination of teat cups, a portable milk vessel, a pulsating mechanism which produces pulsations in the teat cups and is mounted on said vessel, and an independent motor for actuating said pulsating mechanism also mounted on said vessel, substantially as set forth.

9. In a milking machine, the combination of teat cups, a portable milk vessel, a pulsating mechanism which produces pulsations in the teat cups and is mounted on said vessel, and a spring motor for actuating said pulsating mechanism also mounted on said vessel, substantially as set forth.

10. In a milking machine, the combination of teat cups, a suction apparatus, a portable milk vessel, a pulsator mounted on said vessel and operating to apply the suction intermittently to the teat cups, a reversing valve for the pulsator, and an independent motor mounted on said vessel and actuating said valve, substantially as set forth.

11. In a milking machine, the combination of teat cups, a suction apparatus, a portable pulsator which applies the suction intermittently to the teat cups, a reversing valve for the pulsator, a cam for actuating said valve, and a portable motor which actuates said cam, substantially as set forth.

Witness my hand in the presence of two subscribing witnesses.

LOOMIS BURRELL.

Witnesses:
EDWARD WILHELM,
EDWARD C. HARD.